Feb. 4, 1947.　　　　R. J. OLANDER　　　　2,415,188
SHOCK ABSORBER
Filed May 24, 1943
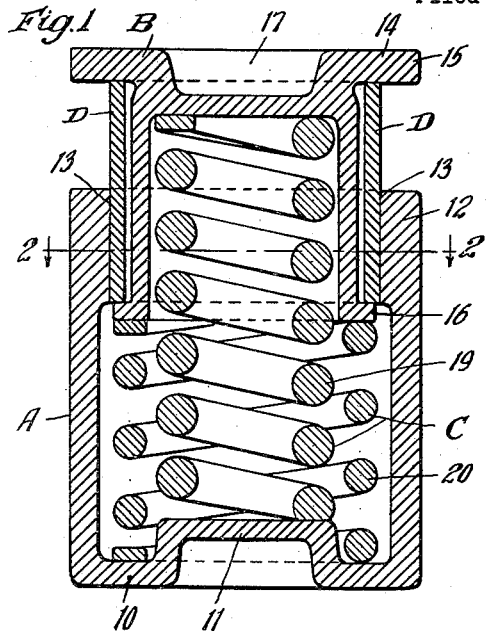
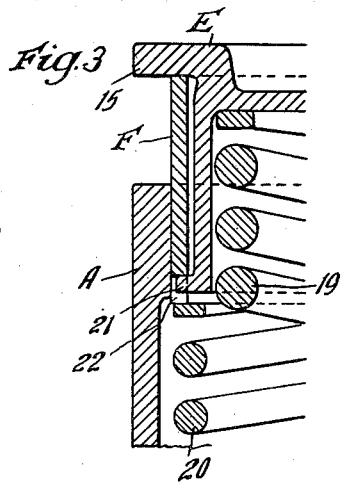
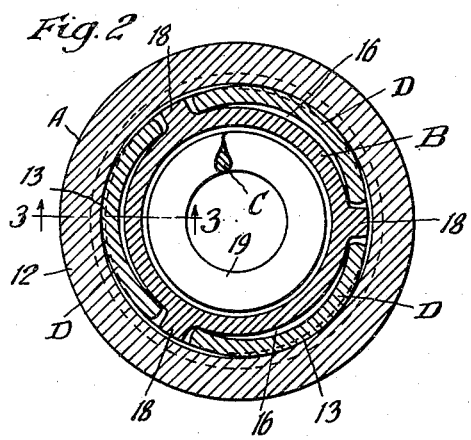
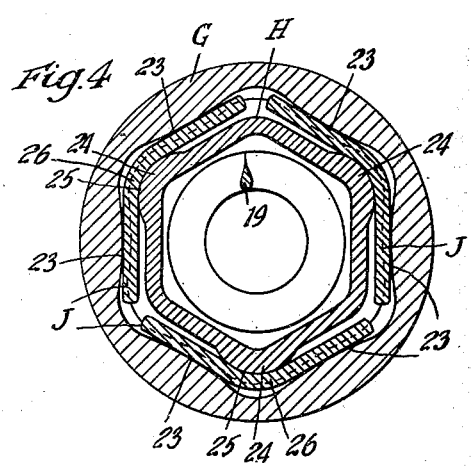
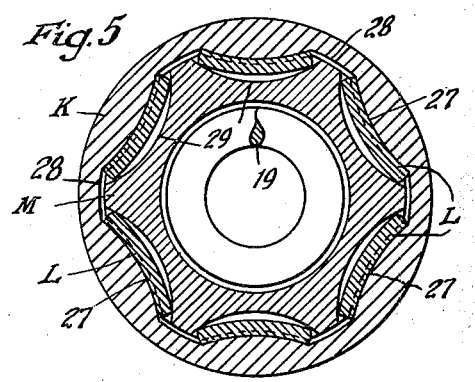
Inventor
Roland J. Olander
By Henry Fuchs
Atty.

Patented Feb. 4, 1947

2,415,188

UNITED STATES PATENT OFFICE 2,415,188

SHOCK ABSORBER

Roland J. Olander, Chicago, Ill., assignor to W. H. Miner, Inc., Chicago, Ill., a corporation of Delaware Application May 24, 1943, Serial No. 488,112

11 Claims. (Cl. 267—9)

This invention relates to improvements in shock absorbers, especially adapted for use as snubbing devices in connection with truck springs of railway cars.

One object of the invention is to provide a shock absorber functioning as a snubbing device for truck springs of railway cars providing substantially uniform resistance during the relative movement thereof, wherein one of the movable friction elements is in the form of a spring plate under compression to produce the desired frictional resistance between said elements.

A further object of the invention is to provide a shock absorber of the type described in the preceding paragraph, replacing at least one of the coil springs of the usual set of springs employed in each cluster of such truck springs, wherein the snubbing action is obtained by relative movement of two friction members, one of which is yieldingly urged toward the other by its own resiliency.

A more specific object of the invention is to provide a friction shock absorber of the character indicated comprising a friction casing having interior friction surfaces; a plunger movably telescoped within the casing; spring resistance means within the casing opposing relative movement of the plunger and casing; and spring friction plates carried by the plunger frictionally engaging the friction surfaces of the casing, wherein the plates are under initial compression to hold the same in frictional contact with said friction surfaces of the casing.

Other objects of the invention will more clearly appear from the description and claims hereinafter following.

In the drawing forming a part of this specification, Figure 1 is a vertical sectional view of the improved shock absorber, said view being taken on two intersecting planes at 120° to each other. Figure 2 is a horizontal sectional view, corresponding substantially to the line 2—2 of Figure 1. Figure 3 is a vertical sectional view, corresponding substantially to the line 3—3 of Figure 2, illustrating another embodiment of the invention. Figure 4 is a view similar to Figure 2 showing still another embodiment of the invention. Figure 5 is another view, similar to Figure 4, showing a still further embodiment of the invention.

Referring first to the embodiment of the invention illustrated in Figures 1 and 2, my improved shock absorber or snubber comprises broadly a casing A; a plunger or follower B; a spring resistance C; and a plurality of friction spring plates D—D—D.

The friction casing A is in the form of a substantially cylindrical tubular member, open at the top end and closed by a transverse bottom wall 10 at its lower end. The bottom wall is provided with an upwardly and inwardly projecting hollow boss 11 adapted to receive the usual spring centering projection of the bottom spring follower plate for the truck springs. At the open upper end of the casing the annular side wall is thickened as indicated at 12, thereby providing an interior annular or cylindrical friction surface 13 which is of smaller diameter than the interior of the casing proper.

The plunger or follower B is in the form of a tubular member of substantially cylindrical transverse cross section, closed at its upper end by a transverse end wall 14 which projects outwardly beyond the cylindrical wall of the tubular member, thus providing an outstanding annular flange 15. The flange 15 is of substantially the same external diameter as the casing A. As shown in Figure 2, the plunger is provided with a laterally projecting annular bottom flange 16 of such a size as to enter freely the friction bore of the casing provided by the cylindrical surface 13 thereof. The central portion of the end wall 14 is depressed to provide a seat 17 adapted to accommodate the usual centering projection of the top spring follower plate for the truck springs. Exteriorly the tubular plunger B is provided with three equally circumferentially spaced longitudinal ribs 18—18—18 which extend from the top flange 15 to the bottom flange 16.

The spring resistance C comprises an inner coil 19 and an outer coil 20, the inner coil having its upper end extending into the plunger B in abutment with the inner surface of the top wall 14 thereof. The lower end of the inner coil 19 abuts the raised boss 11 of the bottom wall of the casing. The outer coil 20 bears at its top and bottom ends respectively on the bottom flange 16 of the plunger B and the bottom wall 10 of the casing A, said bottom end of the spring 20 engaging around the boss 11 and being centered thereby.

The friction spring plates D—D—D are arranged around the plunger B and have frictional engagement with the cylindrical friction surface 13 of the casing. Each plate D is transversely curved, as shown in Figure 2, the curvature of the same being greater than the curvature of the friction surface 13. The plates D—D—D are interposed between the top and bottom flanges 15 and 16 of the plunger B and are alternated with the ribs 18—18—18 of said plunger. In their normal state, before assembly with the plunger B, the plates are of greater curvature than that shown in Figure 2, the same being compressed when the plunger is assembled with the casing so as to assume the curvature shown in Figure 2. The plates are thus flexed when the plunger is assembled with the casing so that their tendency to return to normal curvature will cause the same to be pressed into tight frictional contact with the friction surface 13 of the casing. As will be evident, the ribs 18—18—18 prevent creeping of the plates around the plunger. Inasmuch as the plates are embraced between the flanges 15 and 16 of the plunger B, they are compelled to move in unison therewith inwardly and outwardly of the casing.

The normal height of the spring resistance C is such that the same is placed under initial compression when the device is disposed in operative position in the car truck between the top and bottom spring follower plates of the spring cluster.

In the operation of my improved shock absorbing snubber shown in Figures 1 and 2, assuming the parts to be in the position shown in Figure 1, upon the spring cluster of the truck of the railway car being compressed between the spring follower plates, the casing A and the plunger B will be forced toward each other, the plunger moving into the casing A opposed by the spring resistance C. During the inward movement of the plunger B the friction plates D—D—D, which are compelled to move in unison therewith, are forced to slide inwardly on the friction surface of the casing, thereby providing the required frictional resistance to snub the action of the truck springs and reduce the oscillations of said springs to a desired minimum. Upon expansion of the coils of the truck springs, the spring follower plates are moved apart and the plunger B and casing A will be moved away from each other by the expansive action of the spring resistance C, which reacts against the bottom of the casing and the flange 16 of the plunger B.

The compression of the shock absorber is positively limited by engagement of the flange 15 of the plunger B with the upper end of the casing A, thereby preventing undue compression of the spring resistance C.

Referring next to the embodiment of the invention shown in Figure 3, the construction is identical with that shown in Figures 1 and 2, except as hereinafter pointed out. The shock absorber in Figure 3 comprises a casing identical with the casing A hereinbefore described, a plunger E identical with the plunger B hereinbefore described, except that the plunger E is provided with three radially outwardly projecting lugs 21 at the bottom end thereof instead of a flange. The lugs 21—21—21 are equally spaced circumferentially of the plunger. The friction spring plates, which are indicated by F in Figure 3, are identical with the plates D hereinbefore described, with the exception that they are of greater length than the plates D and are provided with three notches 22 at their lower ends into which the lugs 21 extend. The plates F are embraced between the flange 15 and the lugs 21 of the plunger E and are thus compelled to move in unison with the plunger. As shown, the lower ends of the plates project beyond the lower end of the plunger and bear on the outer spring 20 of the spring resistance. The pressure of the spring 20 thus constantly holds the friction plates seated on the underneath side of the flange 15 of the plunger E.

Referring next to the embodiment of the invention shown in Figure 4, the structure is similar to that shown in Figures 1 and 2 with the exception that the friction shell portion of the casing is of different interior cross section and the plunger and friction plates are also of different transverse cross section. In Figure 4, the friction casing is indicated by G, the plunger by H, and the plates by J—J—J.

The interior of the friction shell portion of the casing G is of broadly hexagonal cross section, as shown, presenting six interior friction surfaces 23 which are slightly convex in transverse direction. The interior corners of the friction shell section of the casing are preferably rounded, as shown.

The plunger H is of hexagonal contour in transverse cross section, as shown, and has enlargements 24 at alternate corners presenting transversely rounded faces 25—25—25. The rounded faces 25—25—25 are located at alternate corners of the friction shell of the casing.

The spring friction plates J—J—J are of V-shaped transverse cross section and each plate cooperates with two adjacent friction surfaces 23—23 of the casing. The connecting portion of each plate between the angularly disposed sections thereof is curved, as indicated at 26, to seat on the corresponding enlargement 24 of the plunger. Each plate J is thus held against creeping movement around the plunger. The plates J when assembled with the casing and plunger are under compression, that is, they are flexed from their normal V-shaped contour so that their inherent resiliency will hold them in tight frictional contact with the friction surfaces of the casing. In their normal unflexed condition, before assembly with the casing, the V-shaped friction plates J have the two sections thereof at a greater angle to each other than that shown in Figure 4 so that they will be under compression when assembled with the casing.

Referring next to the embodiment of the invention shown in Figure 5, the structure is similar to that shown in Figure 2, with the exception that the friction shell section of the casing is provided with six interior friction surfaces, with which six friction plates of reverse curvature cooperate, and the plunger is modified to accommodate these plates.

In Figure 5 the casing is indicated by K, the spring plates by L, and the plunger by M. The casing K has six friction surfaces 27—27—27—27—27—27, which are convex in transverse direction. Between adjacent friction surfaces the casing wall is slightly concave in transverse direction, as indicated by 28. The friction plates are transversely curved, as shown, their concave sides bearing on the convex friction surfaces 27 of the casing.

The plunger M is provided with six transversely concave seats 29 arranged in annular series, said seats being respectively opposed to the friction surfaces 27 of the casing. The six seats 29 respectively accommodate the six plates L and hold them in position against creeping movement around the plunger. In the assembled condition of the device, the plates L are under compression, the curvature of the same in their normal condition when not assembled with the casing and plunger being less than when assembled in the shock absorber. The plates are thus flexed and placed under compression when the parts of the device are completely assembled.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a friction casing having a friction shell section at the upper end thereof; of a sliding friction unit telescoped within the friction shell section of the casing and having movement inwardly and outwardly of the casing, said friction unit including a plunger and a plurality of spring friction plates carried by the plunger, said plunger having a laterally projecting flange at the outer end against which the outer ends of the plates are shouldered, said plates being under compression between the plunger and the interior walls of the friction shell, said plates having portions thereof projecting beyond the lower end of the plunger; a spring within the casing opposing inward movement of the plunger; and a second spring within the casing bearing on the projecting ends of said plates and opposing inward movement thereof.

2. In a shock absorber, the combination with a friction casing having a friction shell section at one end thereof provided with interior friction surfaces; of a plunger telescoped within the shell, said plunger having a laterally projecting flange at its outer end and retaining lugs at its inner end; spring friction plates interposed between the plunger and friction surfaces of the shell, said plates being under compression between said plunger and friction surfaces and having lengthwise sliding engagement with the latter, the front ends of said plates having shouldered engagement with the flange of the plunger, said plates projecting inwardly beyond the inner end of the plunger and having shouldered engagement with the lugs of the plunger to limit inward movement of the plates with respect to the plunger; a spring within the casing engaging said spring plates at their inner ends to resist inward movement of the same; and a second spring within the casing bearing on the plunger and resisting inward movement thereof.

3. In a shock absorber, the combination with a friction casing having a friction shell at one end thereof, said shell having transversely curved interior friction surfaces; of a plunger slidable lengthwise within the casing, said plunger having longitudinally extending, circumferentially spaced ribs; transversely curved friction plates carried by said plunger and having sliding frictional engagement with the friction surfaces of the casing, said plates being alternated with the ribs and having shouldered engagement with said ribs to hold said plates against creeping movement around said plunger; and a spring resistance means within the casing opposing inward movement of said plunger and plates.

4. In a shock absorber, the combination with a friction casing having a friction shell section at one end thereof of substantially hexagonal interior cross section, thereby presenting six longitudinally extending interior friction surfaces; of a plunger telescoped within the shell and having sliding movement lengthwise of said shell, said plunger being of hexagonal cross section; V-shaped resilient friction plates interposed between the plunger and friction surfaces of the shell section of the casing, each of said plates having the angle thereof engaged over one of the corners of the hexagonal plunger with the plate portions at opposite sides of said angle bearing on two adjacent friction surfaces of the shell, said V-shaped plates being under compression between the plunger and friction surfaces of the shell; and spring resistance means within the casing opposing inward movement of the plunger and spring friction plates.

5. In a shock absorber, the combination with a friction casing having a friction shell section at one end thereof, said shell being of substantially hexagonal interior cross section and presenting six interior friction surfaces, said friction surfaces being convex in transverse direction; of a plunger of substantially hexagonal transverse cross section telescoped within the shell; friction plates of transverse V-shaped cross section interposed between the plunger and friction surfaces of the shell and bearing on their inner sides on the corners only of the plunger, the two sections of each of said plates forming the V being substantially flat and having sliding engagement with the friction surfaces of the shell; and a spring resistance within the casing opposing inward movement of the plunger and friction plates.

6. In a shock absorber, the combination with a friction casing having a friction shell section at one end thereof, said shell having an interior friction surface of transverse V-shaped cross section; of a spring friction plate of V-shaped cross section engaged with the V-shaped friction surface of the shell; a plunger slidable lengthwise of the shell, said plunger having a V-shaped portion projecting into the V of the plate, said plate having bearing engagement on its inner side with the apex portion only of said V-shaped projecting portion of the plunger, said plate being movable lengthwise of the shell in unison with the plunger, said V-shaped plate being under compression between said plunger and friction surface of the shell; and spring resistance means opposing inward movement of the plunger and spring friction plate.

7. In a shock absorber, the combination with a friction casing having a friction shell section of substantially hexagonal interior cross section at one end thereof, thereby presenting three interior V-shaped friction surfaces arranged symmetrically around the axis of the mechanism; of a plunger of substantially hexagonal transverse cross section telescoped within the shell, said plunger having bearing projections on the corners thereof between adjacent side faces; V-shaped spring friction plates interposed between the plunger and the friction surfaces of the shell, said V-shaped plates having the angle thereof supported on the bearing projections of the plunger, whereby the side portions of said V-shaped plates are free to flex inwardly, said plates being under compression between the projections of said plunger and the friction surfaces of the shell; and spring resistance means within the casing yieldingly opposing inward movement of the plunger and plates.

8. In a shock absorber, the combination with a friction casing having a friction shell section at one end thereof provided with a plurality of longitudinally extending, interior friction surfaces of convex transverse contour; of a plunger telescoped within the shell and slidable lengthwise with respect to the same, said plunger having longitudinally extending seats of concave transverse contour respectively opposed to said friction surfaces; transversely curved friction plates interposed between the plunger and friction surfaces of the shell, said plates engaging respectively the friction surfaces of said shell, with the concave sides of the same bearing on said surfaces and the convex sides thereof engaged in said seats, the concavity of said seats being greater than the convexity of the inner sides of the plates; and spring resistance means opposing inward movement of said plunger and plates.

9. In a shock absorber, the combination with a friction casing open at its upper end and closed at its lower end and having interior, longitudinally extending friction surfaces at said open end; of a hollow, tubular plunger slidingly telescoped within the open end of the casing, said plunger being open at its lower end and closed by a transverse wall at its upper end; a plurality of transversely bowed, lengthwise extending spring friction plates interposed between the plunger and casing friction surfaces, each of said plates having shouldered engagement at opposite ends thereof with said plunger, said plates being movable in unison with the plunger and having sliding frictional engagement with said friction surfaces; and spring means within the casing yieldingly opposing inward movement of said plunger, said spring means including a central spring element extending into said plunger and having its top and bottom ends bearing respectively on the transverse wall of the plunger and the closed bottom end of the casing.

10. In a shock absorber, the combination with a friction casing open at one end and having longitudinally extending, interior friction surfaces at said open end; of a hollow plunger slidingly telescoped within the open end of the casing, said plunger being open at its lower end and closed at its upper end by a transverse wall, said plunger having abutment flanges at the top and bottom ends, said abutment flange at the upper end overhanging the open upper end of the casing; a plurality of transversely bowed spring friction plates, each of said plates being disposed lengthwise of the plunger and having shouldered engagement at opposite ends with the abutment flanges of the plunger to be moved in unison with said plunger lengthwise of the casing, said plates being under compression between the sides of the plunger and the friction surfaces of the casing; and inner and outer springs within the casing opposing inward movement of the plunger, said inner spring extending into the plunger and bearing at its top end on said transverse wall of the plunger.

11. In a shock absorber, the combination with a friction casing open at its upper end and having interior, longitudinally extending friction surfaces at said open end; of a hollow plunger telescoped within the open end of the casing, said plunger being closed at its upper end and having laterally projecting flanges at the upper and lower ends thereof; a plurality of longitudinally disposed, transversely curved spring friction plates arranged in annular series around said plunger, each plate having shouldered engagement at opposite ends with said flanges of the plunger, said plates having frictional engagement with the friction surfaces of the casing and being under compression between said plunger and friction surfaces; and springs within the casing opposing inward movement of the plunger, one of said springs extending into the hollow plunger and bearing on the closed end thereof.

ROLAND J. OLANDER.

REFERENCES CITED

The following references are of record in the file of this patent:

UNITED STATES PATENTS

| Number | Name | Date |
|---|---|---|
| 2,027,623 | Austin | Jan. 14, 1936 |
| 1,840,124 | O'Connor | Jan. 5, 1932 |
| 1,169,863 | Peycke | Feb. 1, 1916 |
| 1,243,007 | Taylor | Oct. 16, 1917 |
| 2,109,367 | Dentler | Feb. 22, 1938 |
| 1,019,504 | McCombs | Mar. 5, 1912 |